A. C. WIEBE.
TOY VEHICLE.
APPLICATION FILED JAN. 28, 1920.
1,399,833.
Patented Dec. 13, 1921.
3 SHEETS—SHEET 1.
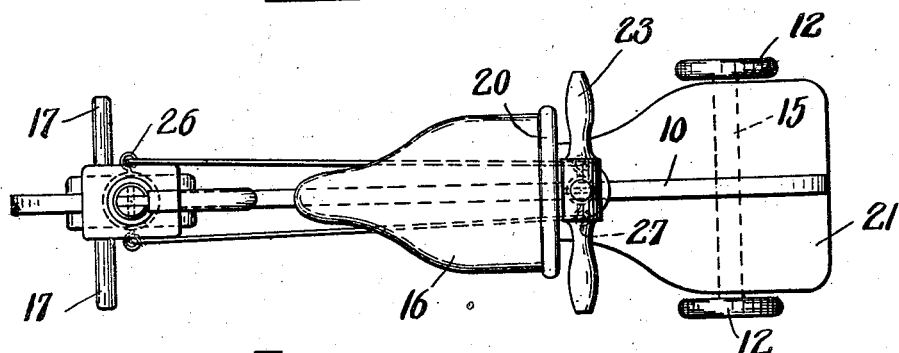
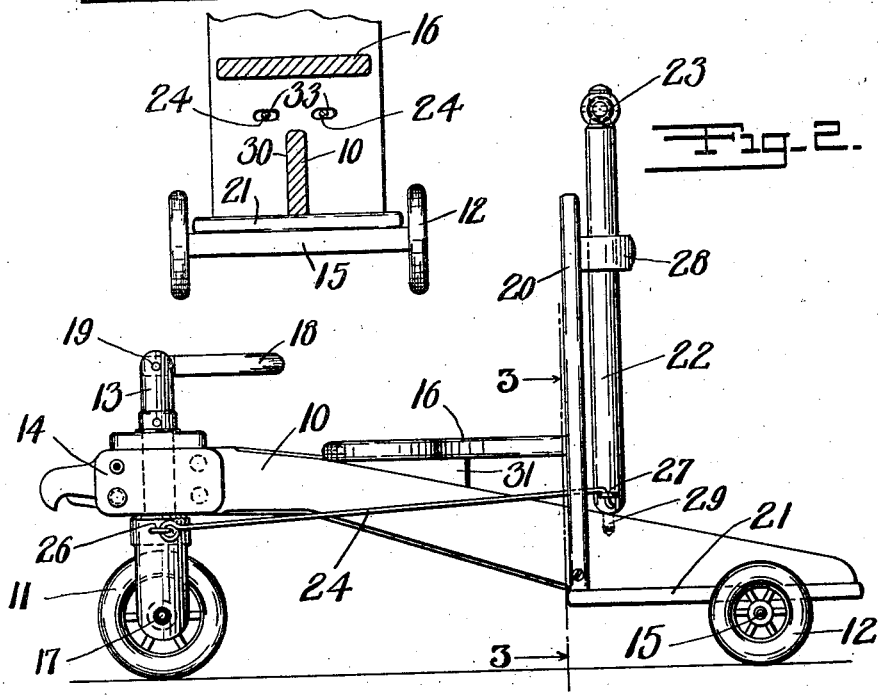
Inventor
Agnes C. Wiebe
By her Attorney
E. W. Marshall A. C. WIEBE.
TOY VEHICLE.
APPLICATION FILED JAN. 28, 1920.
1,399,833.
Patented Dec. 13, 1921.
3 SHEETS—SHEET 2.
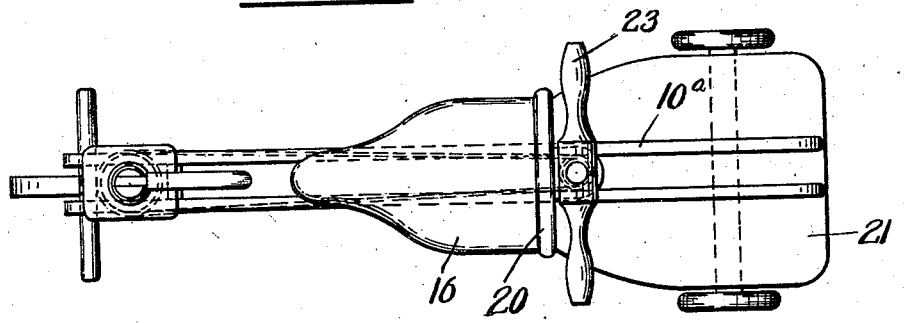
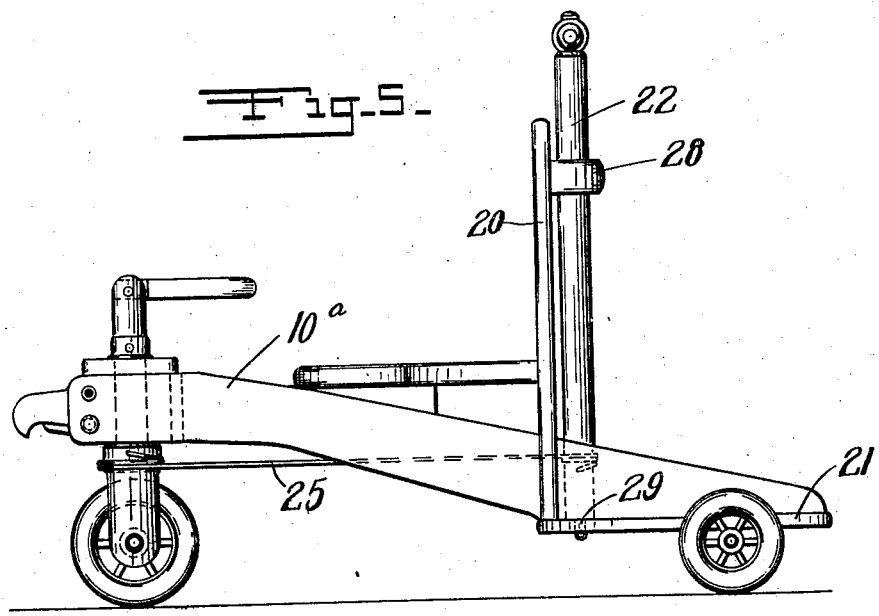
INVENTOR
Agnes C. Wiebe
BY HER ATTORNEY
E. W. Marshall

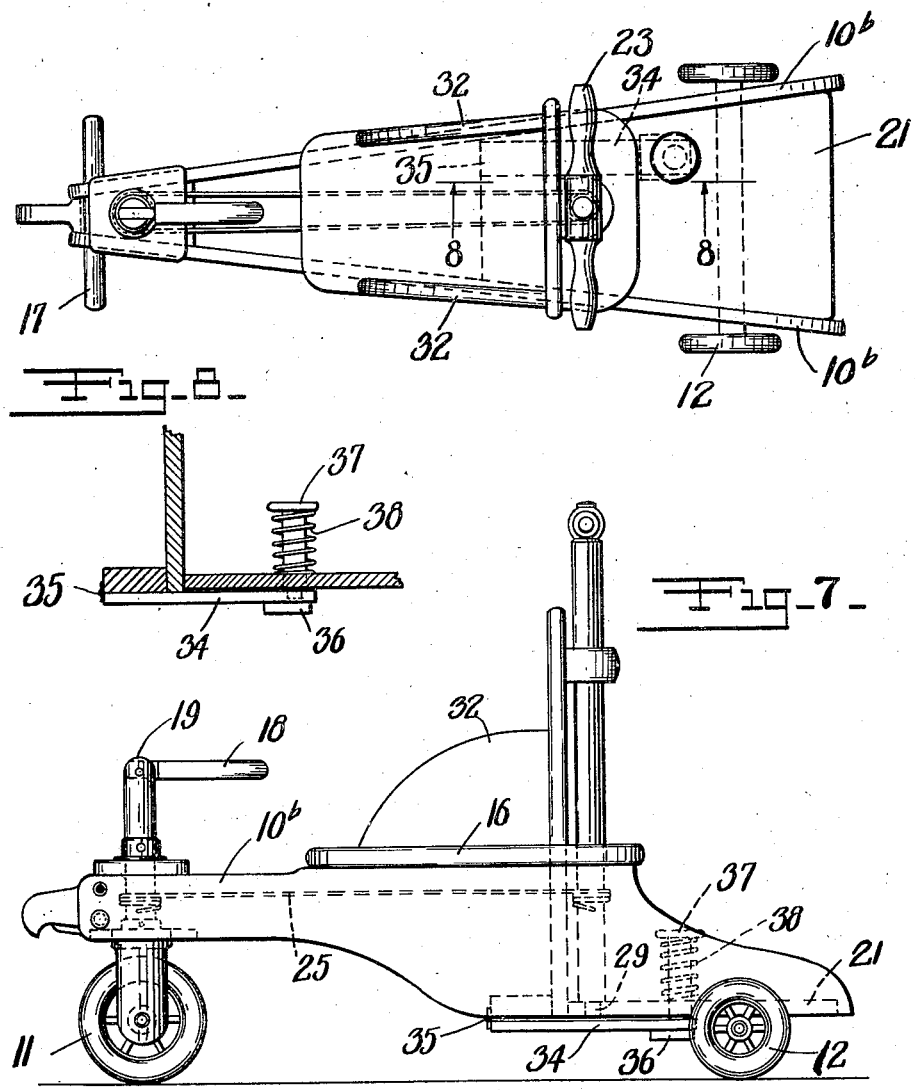

ered way, and the pair of rear wheels are shown carried by a transverse axle.

UNITED STATES PATENT OFFICE.

AGNES C. WIEBE, OF BROOKLYN, NEW YORK.

TOY VEHICLE.

1,399,833.      Specification of Letters Patent.      Patented Dec. 13, 1921.

Application filed January 28, 1920. Serial No. 354,589.

*To all whom it may concern:*

Be it known that I, AGNES C. WIEBE, a citizen of the United States, and a resident of Brooklyn, Kings county, and State of New York, have invented certain new and useful Improvements in Toy Vehicles, of which the following is a specification, reference being had to the accompanying drawings.

The objects of this invention are to provide a simple and practical form of vehicle for children which can be propelled from either a sitting or a standing position on the vehicle and which can be used either as a single or as a two passenger vehicle.

The invention involves a number of novel features of construction, combinations and arrangements of parts, all of which will be set forth in the course of the following specification.

In the accompanying drawings I have illustrated the invention embodied in several different forms, but wish it understood that other modifications than those illustrated may be made without departure from the spirit and scope of the invention as defined in the appended claims.

In the drawings referred to, Figure 1 is a plan view of a simple form of the vehicle.

Fig. 2 is a side elevation of the same.

Fig. 3 is a vertical sectional view taken on substantially the plane of line 3—3 of Fig. 2.

Figs. 4 and 5 are plan and side views respectively of a modified and somewhat heavier type of the vehicle.

Figs. 6 and 7 are similar views of another modification.

Fig. 8 is a detail sectional view taken on substantially the plane of line 8—8 of Fig. 6.

The body of the vehicle comprises, in the first form shown, a longitudinal beam or strut 10 supported at the front by a steering wheel 11 and at the rear by the pair of wheels 12. The front wheel is shown carried by a post 13 journaled in a head portion 14 secured to the front end of the beam and the rear wheels 12 are shown carried by a transverse axle 15.

Mounted on the beam 10 substantially midway between the front and rear wheels is a support 16 adapted to form a seat for a child straddling the beam, said seat being so disposed that a child sitting thereon can propel the vehicle by pushing on the road surface. Foot rests 17 are shown provided on the lower end of the steering post for supporting the feet when the vehicle is used for coasting purposes. The vehicle may be steered by means of these foot rests and by means of a handle 18 which I have shown as pivoted at 19 on the top of the steering column. This pivotal mounting of the handle permits the same to be swung up out of the way or clear over to the front of the steering column when the child is getting on or off the seat.

A back 20 is shown provided at the rear of the seat which is especially desirable as a rest when coasting.

In rear of the seat the vehicle is provided with a platform 21 on which a second child may stand. Also disposed in rear of the seat is a second steering post or column 22 provided at its upper end with a transverse bar or other suitable hand-hold 23 for the rear passenger, said column being connected with the forward steering post by suitable connections such as the links 24 in the first form illustrated, or the flexible steering cables 25 in the other forms illustrated. The links referred to are shown connected at their forward ends with eyes 26 at the opposite sides of the steering post 13 and at their rearward ends with the loops or eyes 27 outstanding from the opposite sides of the upright post 22. This combined hand-hold and steering post is shown pivoted near its upper end in a bracket 28 secured to the back 20 and at its lower end in a bearing 29 provided either in the beam (Fig. 2) or in the platform 21 (Figs. 5 and 7). In the first and second forms of the invention shown, the lower end of the back rest 20 is shown as bifurcated at its lower end at 30 to fit over the beam or beams and the standing platform is shown as resting on the rear axle and as secured to the under face of the rear end of the beam or beams and the lower edge of the back rest. The rear edge of the seat also is preferably secured to the back rest and to a block 31 on the beam, by which construction the several parts of the body of the vehicle are securely braced.

The second form of the invention illustrated in Figs. 4 and 5 differs from the first principally in that a pair of longitudinal beams are provided in place of a single beam, the two beams referred to being here designated 10ª. In this instance the head portion of the device is secured between the forward ends of the two beams. This construction braces the parts somewhat more securely than the first form and is designed for carrying heavier loads.

A still greater bracing effect is obtained by arranging the two longitudinal struts on divergent lines, as indicated at 10$^b$ in Figs. 6 and 7, the body of the vehicle then taking the form of a triangle as most clearly shown in Fig. 6. This style is capable of carrying still greater loads. A further bracing effect is obtained in the last form referred to by means of the side pieces 32 applied between the seat and the back rest, and which sides serve both in the capacity of angle braces between the seat and back rest and as side members for the seat.

I have shown in the sectional view, Fig. 3, how lateral slots 33 may be provided in the back member for the passage of the steering links or cables. These slots may serve also as guiding and protecting means for such steering connections.

It will be apparent from the foregoing that the vehicle may be used either by one or two persons and may be controlled and operated either from the front seat or from the standing platform in the rear.

If desired, the vehicle may be equipped with suitable brake mechanism and in Figs. 6 to 8 I have shown such mechanism in the form of a brake lever 34 pivoted at its forward end at 35 to the under part of the frame and carrying at its rearward end a brake shoe 36 for engagement with the supporting surface, said lever being operated by a foot post or pedal 37 normally upheld by a spring 38. This brake mechanism is particularly desirable for coasting purposes and enables the vehicle to be controlled entirely from the rear.

The standing platform 21 is preferably disposed at a lower level than the seat 16 so that a child standing on said platform with one foot, may readily propel the vehicle with the other foot.

What I claim is:

1. A two passenger toy vehicle comprising a longitudinally extending beam, a steering wheel journaled at the forward end thereof, supporting wheels at the rearward end of the beam, a seat for one passenger supported by the beam at a point intermediate the front and rear wheels, and a standing platform for a second passenger at the rearward end of the beam in rear of the seat aforesaid.

2. A toy vehicle comprising a longitudinally extending beam, a steering wheel journaled at the forward end thereof and provided with a steering handle, supporting wheels at the rearward end of the beam, a seat supported by the beam at a point intermediate the front and rear wheels, a standing platform at the rearward end of the beam in rear of the seat aforesaid, and a steering column disposed at the rear of the seat and provided with hand-holds for operation by a passenger on the standing platform.

3. A toy vehicle comprising a frame, a steering wheel supporting the forward end of the frame and provided with a steering handle, supporting wheels at the rearward end of the frame, a seat carried by the frame intermediate the front and rear wheels, a standing platform carried by the frame in rear of said seat, a steering column journaled in the frame in rear of the seat for operation by a passenger on the standing platform and steering connections from said column to the steering wheel.

4. A toy vehicle comprising a frame, a steering wheel supporting the forward end of the frame, supporting wheels at the rearward end of the frame, a seat carried by the frame intermediate the front and rear wheels, a standing platform carried by the frame in rear of said seat and a back for said seat upstanding from the forward end of the standing platform.

5. A toy vehicle comprising a frame, a steering wheel supporting the forward end of the frame, supporting wheels at the rearward end of the frame, a seat carried by the frame intermediate the front and rear wheels, a standing platform carried by the frame in rear of said seat, a back for said seat upstanding from the forward end of the standing platform and sides forming angle braces between the seat and said back.

6. A toy vehicle comprising a frame, a steering wheel supporting the forward end of the frame supporting wheels at the rearward end of the frame, a seat carried by the frame intermediate the front and rear wheels, a standing platform carried by the frame in rear of said seat, a back for said seat upstanding from the forward end of the standing platform, a steering column journaled at the rear of said back and steering connections from said column to the steering wheel, said steering column having a handhold for one standing on the platform.

7. A toy vehicle comprising a frame, a steering wheel supporting the forward end of the frame, supporting wheels at the rearward end of the frame, a seat carried by the frame intermediate the front and rear wheels, a standing platform carried by the frame in rear of said seat and foot actuated brake mechanism carried by the platform.

8. A toy vehicle comprising spaced longitudinal beams, a wheel-carrying post journaled between the forward ends of said beams, a seat mounted on said beams, a standing platform secured to the rearward end of the beams in rear of the seat and supporting wheels for the platform end of the vehicle.

9. A toy vehicle comprising a longitudinal beam, a head block at the forward end of said beam, a steering post pivoted in said head and carrying a road wheel, a seat supported on the intermediate portion of the beam, a platform at the rearward end of the beam and at a lower level than the seat, an upstanding back for the seat, a steering column journaled at the rear of said back and provided with a hand-hold and steering connections extending from said column through the back to the pivoted post aforesaid.

10. A toy vehicle comprising a longitudinal beam, a head block at the forward end of said beam, a steering post pivoted in said head and carrying a road wheel, a seat supported on the intermediate portion of the beam, a platform at the rearward end of the beam and at a lower level than the seat, an upstanding back for the seat, a steering column journaled at the rear of said back and provided with a hand-hold, steering connections extending from said column through the back to the pivoted post aforesaid and a hand-hold on the upper end of said post in position to be operated by a passenger on the seat.

11. A toy vehicle comprising a longitudinal beam, a head block at the forward end of said beam, a steering post pivoted in said head and carrying a road wheel, a seat supported on the intermediate portion of the beam, a platform at the rearward end of the beam and at a lower level than the seat, an upstanding back for the seat, a steering column journaled at the rear of said back and provided with a hand-hold, steering connections extending from said column through the back to the pivoted post aforesaid, a hand-hold on the upper end of said post in position to be operated by a passenger on the seat and comprising a rearwardly extending lever pivotally connected with the post.

In witness whereof, I have hereunto set my hand this 21 day of Jan. 1920.

AGNES C. WIEBE.